United States Patent [19]

Song

[11] Patent Number: 5,208,662
[45] Date of Patent: May 4, 1993

[54] METHOD OF ENCODING COLOR TELEVISION SIGNAL AND A CIRCUIT THEREFOR

[75] Inventor: Tong-Ill Song, Suwon, Rep. of Korea

[73] Assignee: SamSung Electronics Co., Ltd., Paldal-ku, Rep. of Korea

[21] Appl. No.: 631,995

[22] Filed: Dec. 21, 1990

[30] Foreign Application Priority Data

Dec. 22, 1989 [KR] Rep. of Korea ............... 1989-19320

[51] Int. Cl.$^5$ .................. H04N 9/64; H04N 9/78; H04N 7/18
[52] U.S. Cl. ...................................... 358/40; 358/31; 358/105
[58] Field of Search ................. 358/31, 32, 40, 105

[56] References Cited

U.S. PATENT DOCUMENTS

| | | | |
|---|---|---|---|
| 4,528,598 | 7/1985 | Trytko et al. | 358/40 |
| 4,559,554 | 12/1985 | Nitta | 358/44 |
| 4,626,891 | 12/1986 | Achiha | 358/105 |
| 4,754,322 | 6/1988 | Okuda et al. | 358/31 |
| 4,882,613 | 11/1989 | Masumoto | 358/40 |

Primary Examiner—John K. Peng
Attorney, Agent, or Firm—Robert E. Bushnell

[57] ABSTRACT

An encoding apparatus for encoding color television signals which improves the quality of a display image by selecting a most effective passband of a motion and pattern adaptive 3-D filter filters according to a shape of a pattern or the still and motion image signals an further prevents a mixing of a luminance signal and a chrominance signal at an encoding site to obtain the highest resolution for the display image.

26 Claims, 9 Drawing Sheets

METHOD OF ENCODING COLOR TELEVISION SIGNAL AND A CIRCUIT THEREFOR

BACKGROUND OF THE INVENTION

The present invention relates to a circuit of encoding a composite image signal by synthesizing the composite image signal especially for use in a television, and more particularly to a circuit and method for encoding a color television signal, which improves a resolution of the display image and removes interferences between a chrominance signal and a luminance signal by pre-filtering, in use of a pattern and motion adaptive variable bandwidth filter.

Recently, a digital signal processing technique is employed more frequently as a method to improve the quality of an image signal. Especially, in an IDTV (Improved Definition TV) and EDTV (Enhanced Definition TV), a motion adaptive signal processing technique is used for a digital filter that separates a chrominance signal and a luminance signal; and a scanning line conversion circuit that converts an interlaced scanning image signal with 525 scanning lines into a non-interlaced scanning image signal. By using the method stated above for a television receiver, it is possible to improve the resolution of the display image by efficiently removing cross luminance, components which occur a chrominance signal is mixed to a luminance signal, and cross color components which occur when a luminance signal is mixed to a chrominance signal.

A prior art for achieving the improvements as stated above is shown in FIG. 1 wherein a luminance signal Y and the color difference signals R-Y (I) and B-Y (Q) are separated respectively from the red (R), green (G), and blue (B) color signals which are applied to a gamma correction matrix 4. The color difference signals I, Q are filtered by the corresponding low pass filters 10, 11 and modulated by a quadrature phase modulator 5 according to a chrominance sub-carrier signal 1 and a burst flag signal 2.

The signal output from the quadrature phase modulator 5 and the luminance signal Y from the gamma correction matrix 4 are combined at a mixer 6 according to an input signal 3 which is a synchronous and blocking pedestal signals. To obtain a resulting encoded video signal CV, the combined signal output from the mixer 6 is low-pass-filtered by the low pass filter 8.

Since the stated prior art is not a fundamental processing method which removes the cross luminance components from the luminance signal and the chrominance signal, low quality in a resolution of the display image and interference of the image by the chrominance signal and the luminance signal often follow.

SUMMARY OF THE INVENTION

It is therefore an object of the present invention to provide a circuit and method of improving the quality of a display image at a receiving site by selecting a most effective bandwidth of the filters according to a shape of a pattern or the still and motion image signals, while elevating the resolution of the display image by using a motion and pattern adaptive three dimensional filter, which prevents a mixing of a luminance signal and a chrominance signal at an encoding site and sustains the best resolution.

To achieve the above and other objects of the present invention, the frequency zones of a vertical, horizontal, and temporal axes in a three dimensional filter are adjusted according to a motion signal detected on the basis of an intrafield image signal pattern and a frame difference signal so as to reduce an interference of a luminance signal and chrominance signal and to use an image frequency zone effectively during an encoding of red (R), green (G), and blue (B) color signals which may be provided from, for example, a camera into a composite image signal.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

Figure 1:
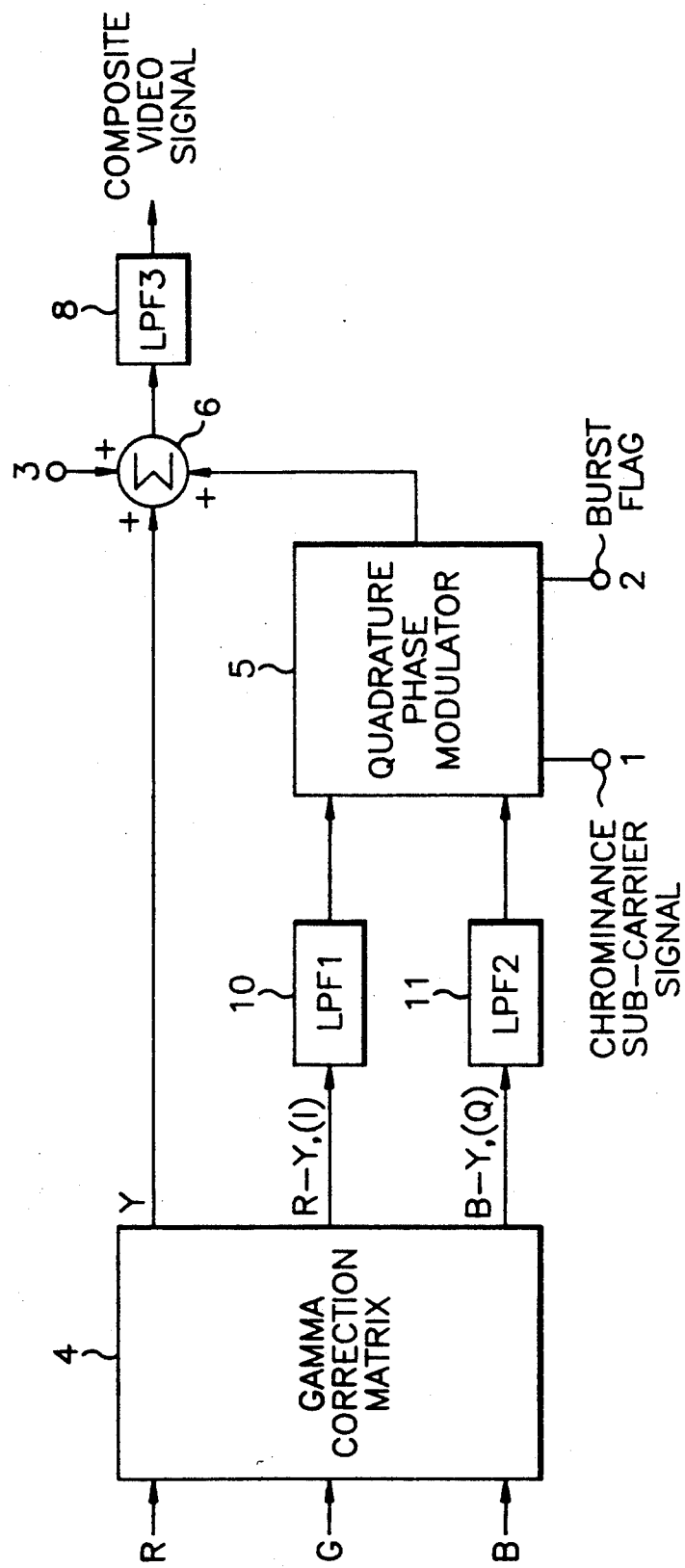
FIG. 1 shows an encoding circuit of the prior art.
Figure 2:
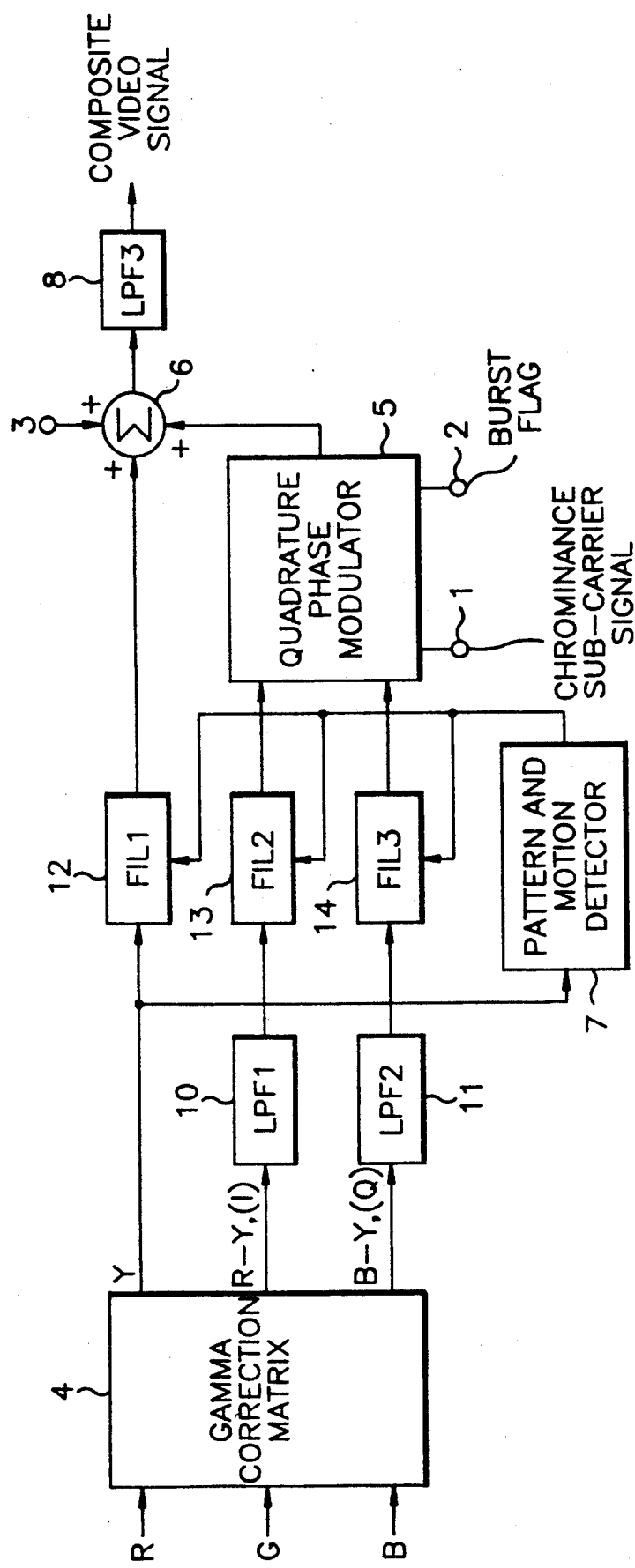
FIG. 2 shows one embodiment of a circuit of encoding color television signal according to the present invention.

Referring to FIG. 2, the like reference numerals and symbols will represent the like construction and function of the same in FIG. 1. That is, low pass filters 10, 11 are connected to a gamma correction matrix 4, and a signal output from a quadrature phase modulator 5 is combined with a luminance signal Y at a mixer 6. Then, the combined signal is low-pass-filtered at a low pass filter 8.

In detail, the luminance signal Y separated from the red (R), green (G), and blue (B) color signals by the gamma correction matrix 4 is connected to an input terminal of a first filter 12. The color difference signals R-Y (I) and B-Y (Q) separated by the gamma correction matrix 4 are connected to input terminals of low pass filters 10 and 11; and the outputs from the low pass filters 10 and 11 are connected to input terminals of a second filter 13 and a third filter 14 respectively. The luminance signal Y is also connected to a pattern and motion detecting circuit 7 to detect a pattern and motion of the luminance signal Y. The signal output from the pattern and motion detecting circuit 7 is applied to first, second and third filters 12-14, the output from the first filter 12 is connected to a mixer 6, and the outputs from the second filter 13 and the third filter 14 are applied to a quadrature phase modulator 5.

Figure 3:
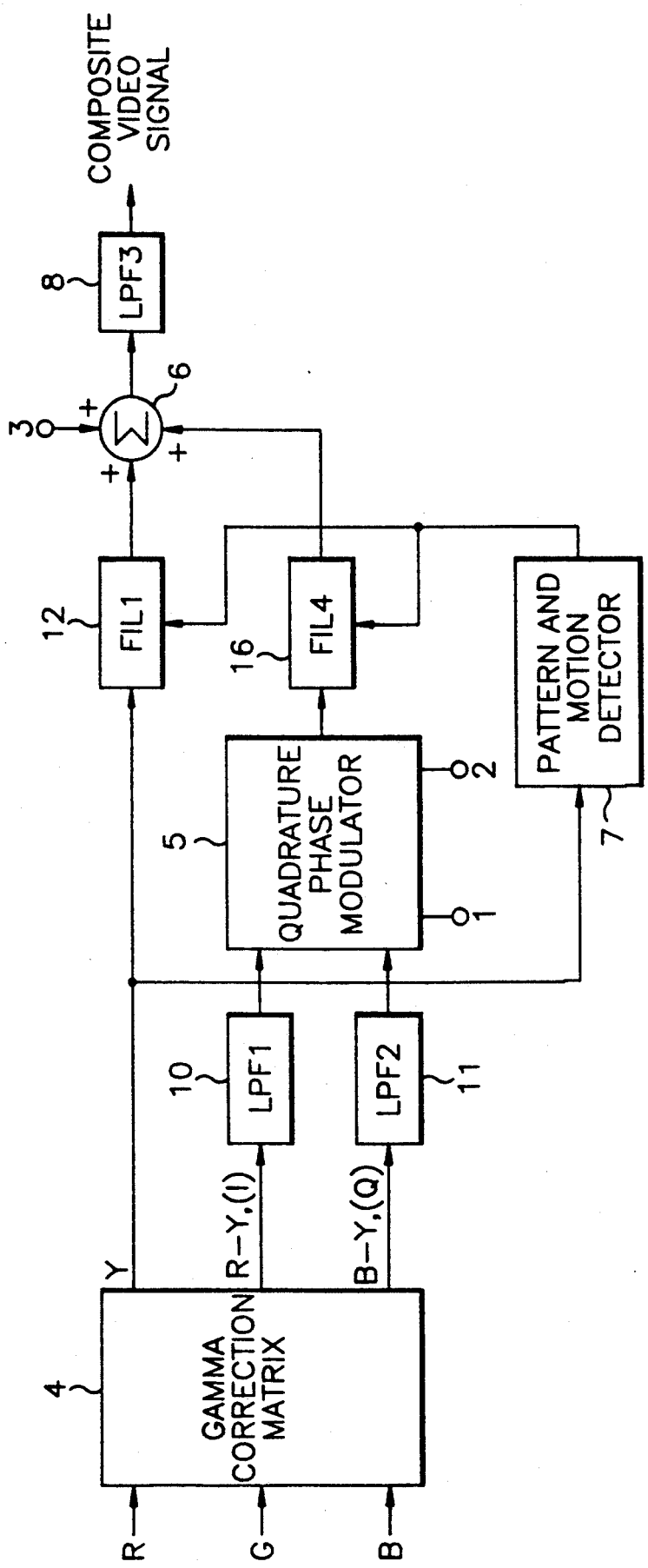
FIG. 3 shows another embodiment of a circuit of encoding color television signal according to the present invention.

FIG. 3 is another embodiment of the circuit of encoding color television signal according to the present invention in which similar symbols are used to refer to the gamma correction matrix 4, the low pass filters 10 and 11, the mixer 6, the low pass filter 8, and the quadrature phase modulator 5. In FIG. 3, the luminance signal Y of the gamma correction matrix 4 is input into a first filter 12, and a pattern and motion detecting circuit 7. The color difference signals R-Y (I) and B-Y (Q) are input into the quadrature phase modulator 5 through the first and second low pass filters 10 and 11; and the output from the quadrature phase modulator 5 is input into an input terminal of a fourth filter 16. The output of the pattern and motion detecting circuit 7 is input into the first and the fourth filters 12, 16, and the outputs of the first filter 12 and the fourth filter 16 are input into the mixer 6.

Figure 4:
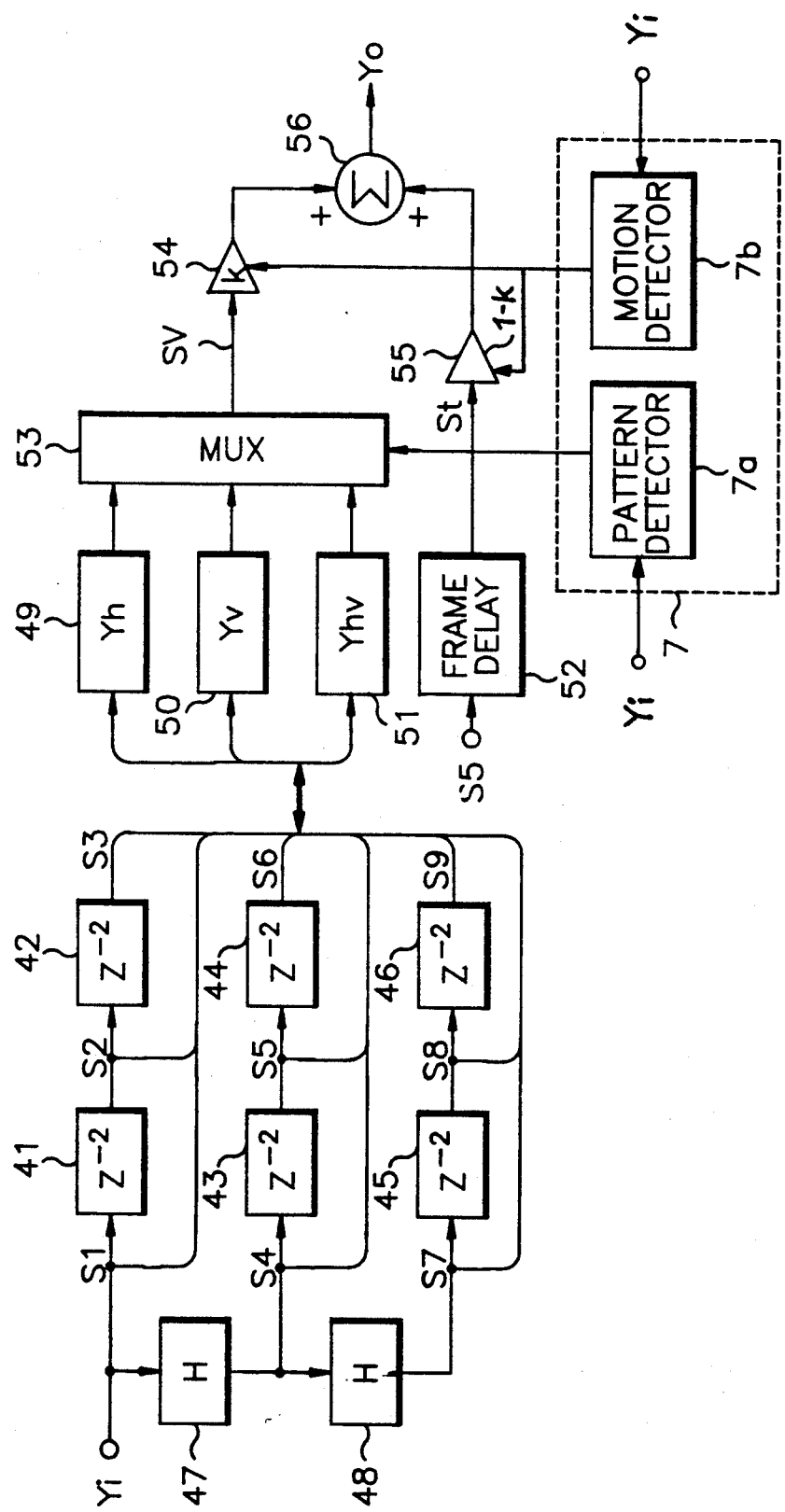
FIG. 4 shows a detailed circuit diagram of the first, second and third filters 12-14 of FIG. 2 and the first filter 12 a FIG. 3 according to the present invention.

FIG. 4 is a detailed circuit diagram of the first, second and third filters 12-14 in FIG. 2 and a fourth filter 16 in FIG. 3. In the drawing, first and second clock delay circuits 41, 42 coupled in series are connected to a luminance input terminal Yi. A first horizontal delay circuit 47 is also connected to the luminance input terminal Yi. The output of the first horizontal delay circuit 47 is coupled to a third clock delay circuit 43 and a fourth clock delay circuit 44 in series. A second horizontal delay circuit 48 is connected to the output of the first horizontal delay circuit 47; and the output of the second horizontal delay circuit 48 is successively coupled to a fifth clock delay circuit 45 and a sixth clock delay circuit 46.

A horizontal filter 49 is connected to an output S4 from the first horizontal delay circuit 47 and outputs S5 and S6 from the third and fourth clock delay circuits 43, 44. A vertical filter 50 is connected to outputs S2, S5, and S8 from the first, third, and fifth clock delay circuits 41, 43, and 45, respectively. A horizontal-vertical filter 51 is connected to outputs S4 and S7 from the first and the second horizontal delay circuits 47 and 48 and to outputs S2, S3, S5, S6, S8, and S9 from the first through sixth clock delay circuits 41-46. A multiplexer 53 selects an output from one of the vertical, horizontal, and horizontal-vertical filters 49-51 according to an output from the pattern detector 7a. A gain controller 55 takes an output from a frame delay circuit 52 as an input to delay the input signal S5 from the output of the third clock delay circuit 43 by a frame unit; and a mixer 56 outputs a mixed gain-controlled signal that is gain-controlled by the gain controllers 54 and 55 according to an output from the motion detector 7b.

Figure 5A:
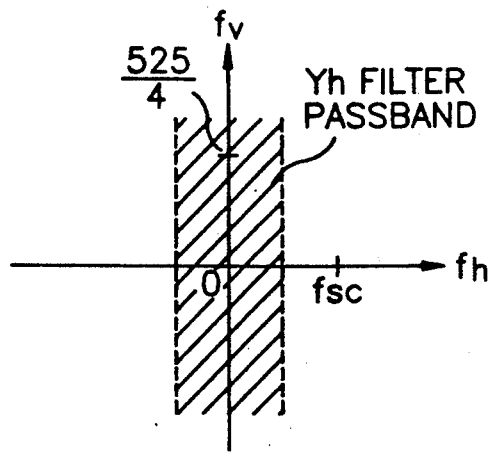
FIGS. 5A through 5C are spatial frequency zone selecting characteristics of vertical, horizontal, and horizontal-vertical filters 49-51 of FIG. 4 according to the present invention, respectively.
Figure 5B:
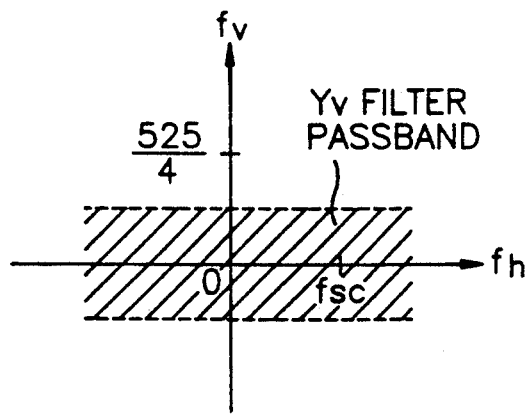
Figure 5C:
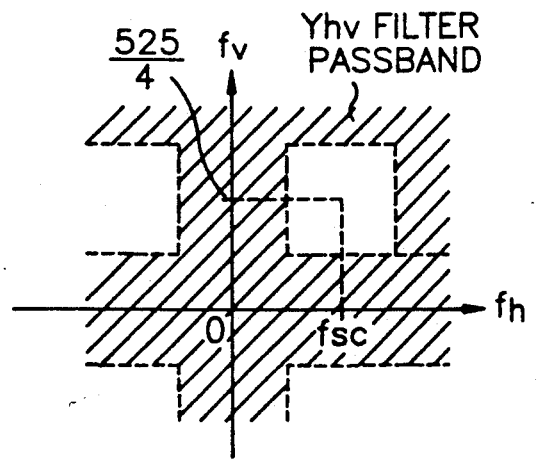

FIGS. 5A through 5C show spatial frequency zone selecting characteristics of the horizontal filter 49, the vertical filter 50, and the horizontal-vertical filter 51 in FIG. 4 according to the present invention. FIG. 5a shows frequency selecting characteristics of the horizontal filter 49; FIG. 5b shows frequency selecting characteristics of the vertical filter 50; and 5c is frequency selecting characteristics of the horizontal-vertical filter.

Figure 6:
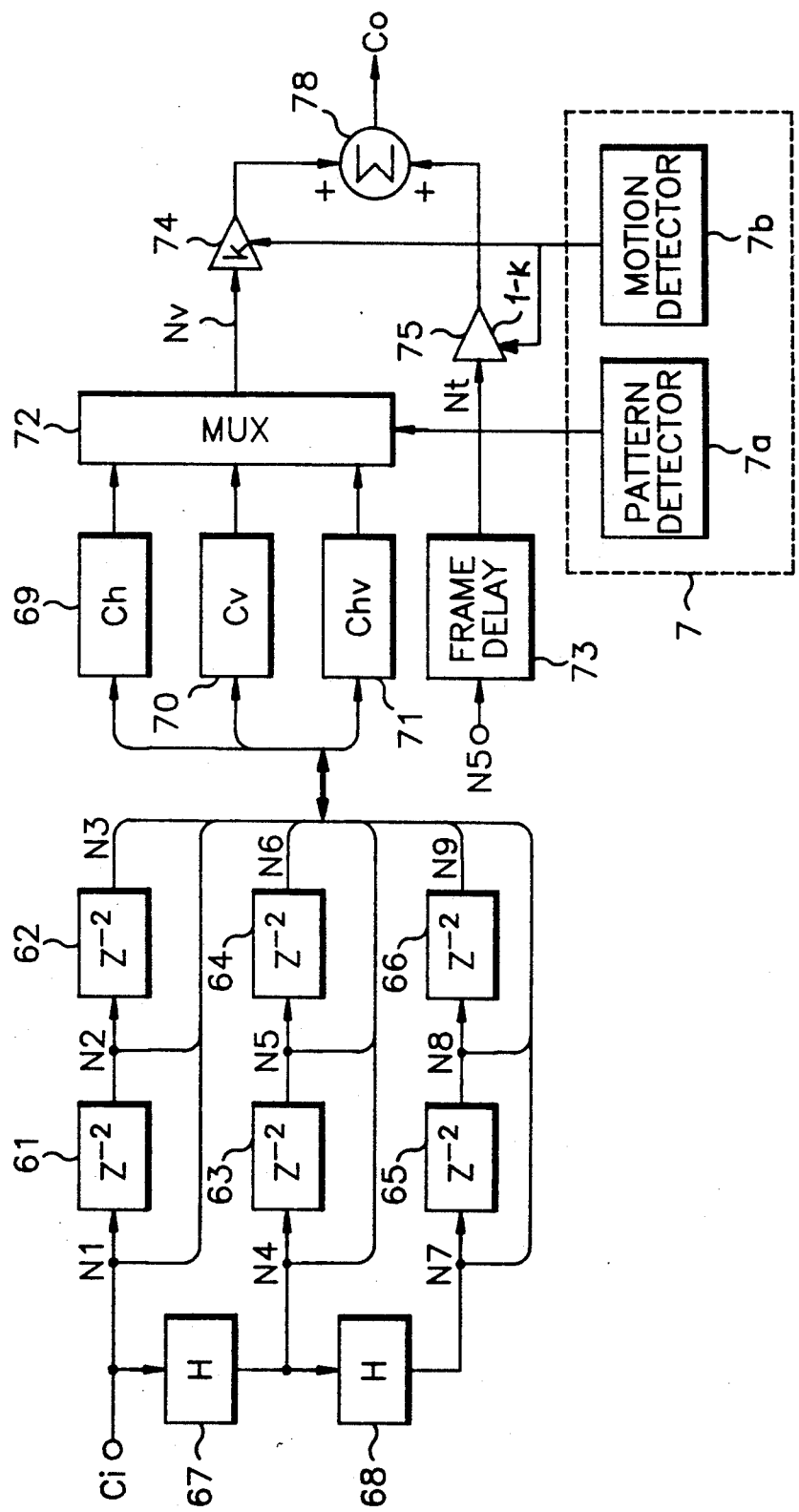
FIG. 6 shows a detailed circuit diagram of the fourth filter 16 of FIG. 3 according to the present invention.

FIG. 6 is a specific circuit diagram of the fourth filter 16 in FIG. 3 according to the invention, wherein the reference numerals 67 and 68 represent horizontal delay circuits; numerals 61 through 66 represent clock delay circuits; numerals 69 represents a horizontal filter; numerals 70 represents a vertical filter; numerals 71 represents a horizontal-vertical filter; numerals 72 represents a multiplexer; and numerals 74 and 75 represent gain controllers, having the same connection as shows in FIG. 4.

Figure 7A:
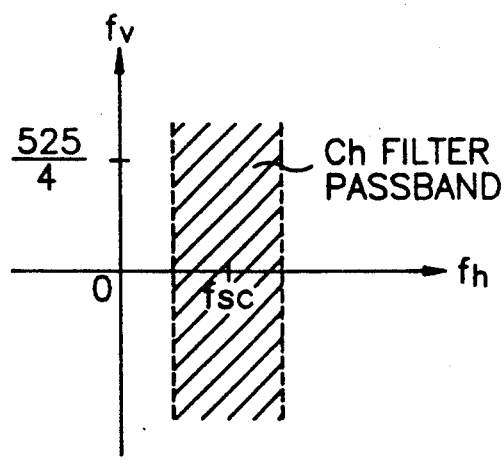
FIGS. 7A through 7C are views of spatial frequency zone selecting characteristics of a horizontal, vertical and horizontal-vertical filters 69-71 in FIG. 6 according to the present invention.
Figure 7B:
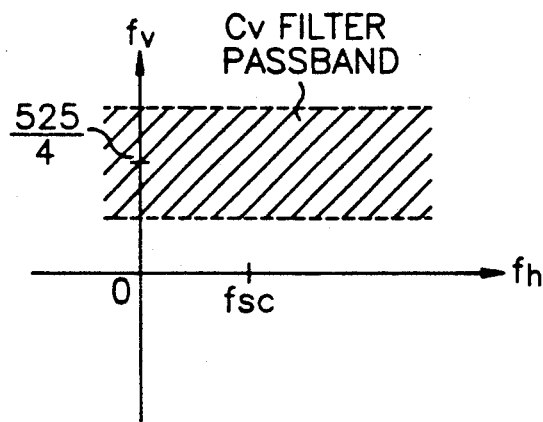
Figure 7C:
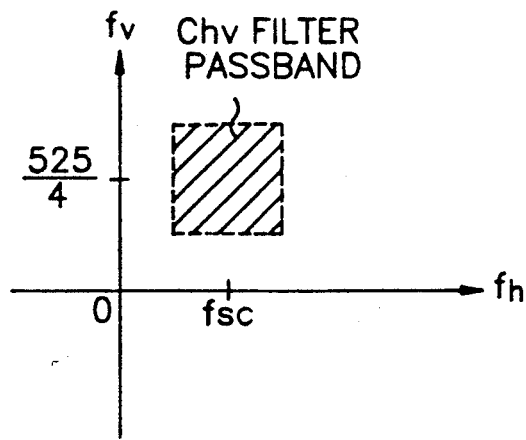

FIGS. 7A through 7C are spatial frequency zone selecting characteristics of the vertical, horizontal, and horizontal-vertical filters 69-71 in FIG. 6 according to the present invention, respectively.

Figure 8:
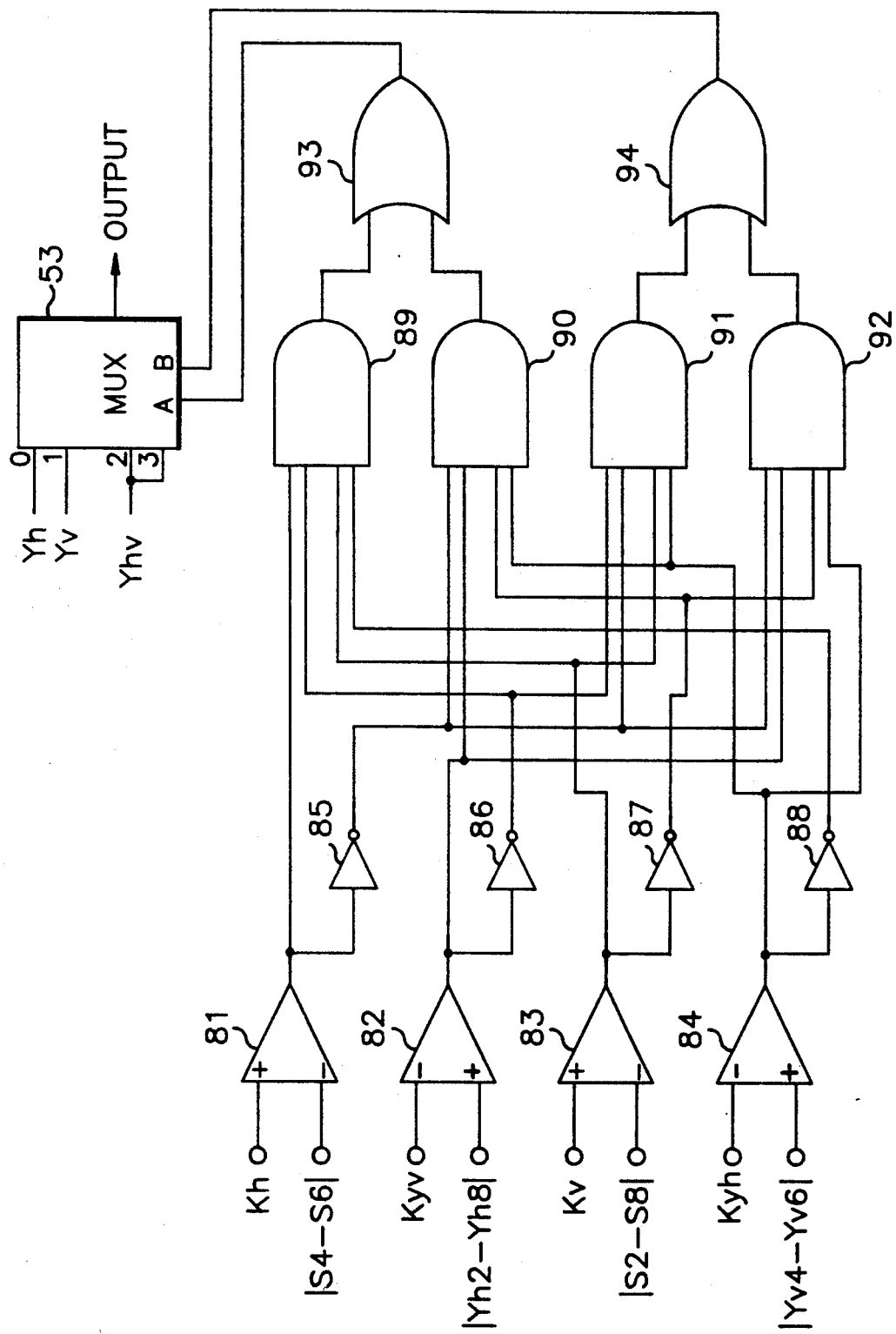
FIG. 8 shows a detailed circuit diagram of the pattern detecting circuit 7a of FIGS. 2, 3, 4, and 6 according to the present invention.

FIG. 8 is a detailed diagram of the pattern detector 7a as shown in FIGS. 4 and 6 according to present invention. In FIG. 8, comparators 81-84 compare the outputs from the first and second horizontal delay circuits 47, 48 and the first through sixth clock delay circuits 41-46 with a plurality of threshold voltages. Inverters 85-88 invert the output from the comparators 81-84; and the selection signals to be provided to the selection terminals A and B of the multiplexer 53 are generated by AND gates 89-92 and OR gates 93-99, which perform a specific logic combination for the signals output from the comparators 81-84 and the inverters 85-88. The multiplexer 53 selects one of the output signals $Y_h$, $Y_v$ and $Y_{hv}$ from the horizontal filter 49, the vertical filter 50, and the horizontal-vertical filter 51 in accordance with the selection signals at the selection terminals A and B to provide a pattern value signal.

Figure 9:
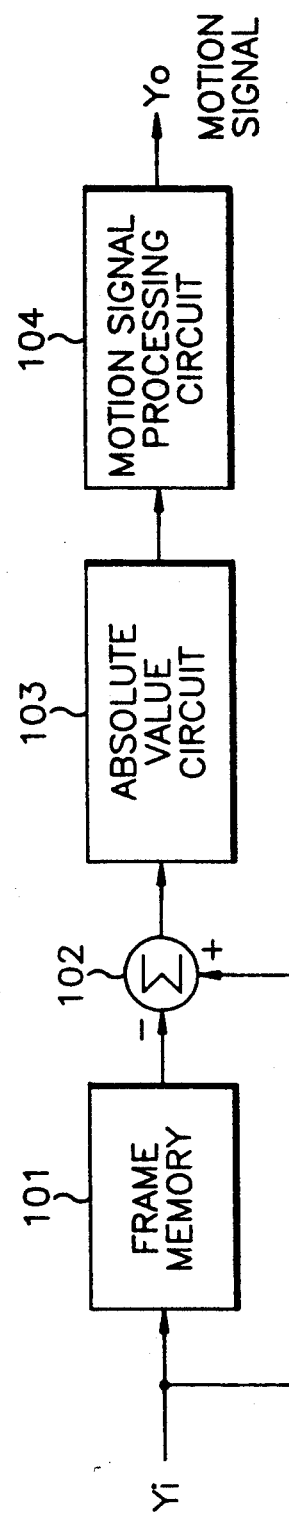
FIG. 9 shows a detailed circuit diagram of the motion detecting circuit 7b of FIGS. 2, 3, 4, and 6 according to the present invention.

FIG. 9 is a detailed circuit diagram of the motion detector 7b as shown in FIG. 4 and 6, in which a frame memory 101 delays the luminance signal input Yi by one frame, and a subtractor 102 subtracts the output from the frame memory 101 from the luminance signal input Yi. Then, an absolute value circuit 103 converts the output from the subtractor 102 to its absolute value. A motion signal processing circuit 104 then processes the output from the absolute value circuit 103 to provide a motion signal.

Referring back to FIGS. 2-9, the operations of each embodiments of the present invention will be discussed. First of all, with reference to an operating effect of the first filter 12, in the event that there is no edge in a horizontal direction (the horizontal correlation is high), that is $|S4-S6| \leq Kh$ and $|Yh2-Yh8| \geq Kyv$ for the luminance signal Y. In addition, the multiplexer 53 in FIG. 4 selects the output from the horizontal filter, i.e., $Yh = 0.25.S4 + 0.5.S5 + 0.25.S6$, if there is an edge in a vertical direction is detected. In this case, the selecting characteristics in the spatial frequency zone is the same as shown in FIG. 5A. Here, the fact that there is no edge in the horizontal direction means a signal spectrum is distributed to a lower zone of a horizontal frequency direction. On other hand, there is an edge in the vertical direction, higher frequency components in the signal spectrum are contained in a vertical direction. Therefore, a filter which has the characteristics as shown in FIG. 5A is adequate.

In case where $|S2-S8| \leq Kv$ and $|Yv4-Yv6| \geq Kyh$; there is no edge in the vertical direction (the vertical correlation is high), but there is edge in a horizontal direction, the multiplexer 53 in FIG. 4 selects an output from the vertical filter 50. Thus, $Yv = 0.25.S2 + 0.5.S5 + 0.25.S8$. In this case, selecting characteristics in the spatial frequency zone is the same as FIG. 5B. Here, the fact that there is no edge in the vertical direction means a signal spectrum is distributed to a lower zone of a vertical frequency direction. On the other hand, when there is an edge in the horizontal direction, higher frequency components in the signal spectrum are contained in a horizontal direction. Therefore, a filter which has the characteristics as shown in FIG. 5B is adequate.

In case where $|S2-S8|\leq Kv$ and $|Yv4-Yv6|\geq Kyh$, and $|S4-S6|\leq Kh$ and $|Yhz-Yh8|\geq Kyv$, the multiplexer 53 in FIG. 4 selects an output from the horizontal-vertical filter 51. Thus, $Yhv = \frac{1}{4}\cdot S5 + \frac{1}{8}\cdot(S2+S8+S4+S6) - 1/16\cdot(S1+S3+S7+S9)$. In this case, selection characteristics in the spatial frequency zone is the same as FIG. 5C. Here, it means either there is no edge in both of the vertical and horizontal directions or there is edge in both of the vertical and horizontal directions.

If there are edges in both directions, the signal spectrum is distributed widely in both vertical and horizontal directions, thus it is necessary to remove the signal spectrum occupied by a modulated chrominance signal as FIG. 5C to prevent the modulated chrominance signal from an interference. Also, if there is an edge in neither direction, the signal spectrum is distributed lower parts of the vertical and horizontal frequency directions, thus selecting characteristics in the spatial frequency zone as in FIG. 5C is adequate.

In addition, the color difference signals I and Q are filtered by the second and third filters which have similar effects to the first filter 12 and then modulated by the quadrature phase modulator 5. The output from the quadrature phase modulator 5 is combined with the output from the first filter 12. At this time, a spatial frequency of a chrominance sub-carrier for the quadrature phase modulator 5 is fh=fsc and fv=525/4 to separate the luminance signal and the modulated chrominance signal.

Referring to the operation of FIG. 3, for the luminance signal Y, it is the same as in FIG. 2, but for the color difference signal I and Q, a quadrature phase modulation is performed by a well-known method, and the modulated output is filtered by the fourth filter 16 which uses a similar principle as the first filter 12. The output from the fourth filter 16 and the luminance signal Y filtered by the first filter 12 are combined to form a composite image signal.

In case where $|S4-S6|\leq Kh$ and $|Yh2-Yh8|\geq Kyv$, the multiplexer 72 in FIG. 6 selects the horizontal filter 69; $Ch = -\frac{1}{4}\cdot N4 + \frac{1}{2}\cdot N5 - \frac{1}{4}\cdot N6$. In other words, for the luminance signal Y, there is no edge in a horizontal direction, but there is an edge in a vertical direction. The selecting characteristics of a spatial frequency zone for the horizontal filter 69 is as shown in FIG. 7A.

In case where $|S2-S8|\leq Kv$ and $|Yv4-Yv6|\geq Kyv$, the multiplexer 72 in FIG. 6 selects the vertical filter 70; $Cv = -\frac{1}{4}\cdot N2 + \frac{1}{2}\cdot N5 - \frac{1}{4}\cdot N8$. In other words, for the luminance signal Y, there is no edge in a vertical direction, but there is an edge in a horizontal direction. The selecting characteristics of a spatial frequency zone for the horizontal filter 70 is as shown in FIG. 7B.

In case where $|Yh2-Yh8|\geq Kyv$ and $|Yv4-Yv6|\geq Kyh$, and $|S4-S6|\leq Kh$ and $|S2-S8|\leq Kv$, the multiplexer 72 in FIG. 6 selects a horizontal-vertical filter 71; $Chv = \frac{1}{4}\cdot N5 - [-\frac{1}{8}\cdot(N2+N8+N4+N6)] + 1/16\cdot(N1+N3+N7+N9)$. The selecting characteristics of a spatial frequency zone for the horizontal filter 71 is as shown in FIG. 7C.

The detailed diagram of the pattern detecting circuit 7a is shown in FIG. 8. The pattern detecting circuit 7a includes comparators 81-84, inverters 85-88, AND gates 89-92, and OR gates 93, 94. In case where there is no edge in horizontal direction, that is $|S4-S6|\leq Kh$, the output of the comparator 81 becomes logic high. When there is an edge in the vertical direction, that is $|Yh2-Yh8|\geq Kyv$, an output from the comparator 82 becomes logic high. Here, $Yh2 = \frac{1}{4}\cdot(S1+2S2+S3)$, and $Yh8 = \frac{1}{4}\cdot(S7+2S8+S9)$. When there is no edge in a vertical direction, that is $|S2-S8|\leq Kv$, the output of the comparator 83 becomes logic high. When there is edge in a horizontal direction, that is $|Yv4-Yv6|\geq Kyh$, the output of the comparator 84 becomes logic high. Here, $Yv4 = \frac{1}{4}\cdot(S1+2S4+S7)$, and $Yv6 = \frac{1}{4}\cdot(S3+2S6+S9)$. The combination signals output from the comparators 81-84, the inverters 85-88, the AND gates 89-92, and the OR gates 93, 94 are used to select one of the horizontal, vertical, horizontal-vertical filters 69-73 and 49-51. It is clear that anyone who has general knowledge in this field can easily understand the operating principle of FIG. 8.

A detailed diagram of the motion detecting circuit 7b is shown in FIG. 9. The current luminance signal Y and the output of the frame memory 101 are used to obtain the frame difference signal between the current frame and a preceding frame, and an absolute value of the frame difference signal is calculated by the absolute value circuit 103. The output of the absolute value circuit 103 is applied to the motion signal processing circuit 104 to obtain a quantity of motion to control a gain (where, $0\leq k\leq 1$) of the gain controllers 54, 55. If the quantity of the motion becomes larger, then the k value becomes larger. Especially, when the k value is identical to 1, the outputs of the filters 49-51 and 69-71 in FIGS. 4 and 6 are equal to the output from the multiplexers 53, 73 and when the k value is zero, outputs of the filters 49-51 and 69-71 are one-frame-delayed signals. When the k value is a value between zero and one, the outputs of the filters 49-51 and 69-71 in FIGS. 4 and 6 become $Yo = k\cdot Sv + (1-k)\cdot St$ and $Co = k\cdot Nv + (1-k)\cdot Nt$, respectively.

While the invention has been particularly shown and described with reference to a preferred embodiment, it will be understood by those skilled in the art that the horizontal-vertical filter 51 alone can be used without using the horizontal and vertical filters 49, 50 and the pattern detection circuit 7a of FIG. 4 and that the horizontal-vertical filter 71 alone can be used without using the horizontal and vertical filters 69, 70 and the pattern detection circuit 7a of FIG. 6 without departing from the spirit and scope of the invention.

If the encoding method invented is used at a transmitting site, it is still possible to sustain a compatibility with an existing TV system. Furthermore, by applying three dimensional decoding at a receiving site, a quality of an image can be improved dramatically.

As stated above, in a composite image signal encoding circuitry such as TV camera and VTR, the present invention has an advantage in that a best picture quality is sustained at a receiving site by decreasing interference between luminance signal and color signal, shifting the bandwidth of the filters according to still and motion image, and selecting a most effective bandwidth of a filter according to a shape of a pattern.

What is claimed is:

1. A method of encoding a composite image signal in a color television having a gamma correction matrix, a plurality of low pass filters, a quadrature phase modulator and a mixer, said method comprising the steps of:
   detecting intrafield image patterns and frame differences of said composite image signal to provide pattern and motion value signals;
   determining a bandwidth of a three dimensional filter with respect to vertical, horizontal, and temporal axes according to said pattern and motion value signals for a luminance signal of said gamma correction matrix and chrominance signals of said plurality of low pass filters; and controlling amplitude gains of output signals passed through the bandwidth of said three dimensional filter according to said pattern and motion value signals.

2. A circuit for encoding a composite image signal in a color television having gamma correction matrix means, first and second low pass filters, quadrature phase modulator means and mixer means, comprising:

a luminance signal from said gamma correction matrix means is coupled to an input terminal of first filter means, and color-difference signals from said gamma correction matrix means are coupled to input terminals of said first and second low pass filters;

outputs from said first and second low pass filters are coupled to input terminals of second and third filter means;

a pattern value and a motion value are detected from said luminance signal by pattern and motion detecting means;

the output from said pattern and motion detecting means is applied to said first, second and third filter means;

the output from said first filter means is coupled to said mixer means; and the outputs from said second and third filter means are coupled to said quadrature phase modulator means, and the output of said quadrature phase modulator means is coupled to said mixer means to provide an encoded video signal.

3. A circuit for encoding a composite image signal in a color television having gamma correction matrix means coupled to receive a plurality of color signals, first and second low pass filters, quadrature phase modulator means and mixer means, comprising:

a luminance signal from said gamma correction matrix means is applied to first filter means, and color-difference signals from said gamma correction matrix means are applied to said quadrature phase modulator means via said first and second low pass filters;

the output of said quadrature phase modulator means is coupled to an input terminal of second filter means;

the luminance signal is applied to pattern and motion detecting means; and the output from said pattern and motion detecting means is applied to said first and second filters means, and the outputs from said first and second filters means are input to said mixer means to provide an encoded video signal.

4. A circuit as claimed in claim 3, wherein said pattern and motion detecting means comprises:

a plurality of comparator means for comparing the outputs of first and second horizontal delay means and first, second, third, fourth, fifth and sixth clock delay means with a plurality of predetermined threshold voltages;

a plurality inverter means for inverting the outputs of said plurality of comparator means; and logic means for generating selection signals to be provided to selection terminals of a multiplexer, the outputs of said plurality of comparator means and said plurality of inverter means being logically combined by a plurality of AND gates, and the outputs of said plurality of AND gates being logically combined by a plurality of OR gates.

5. A circuit as claimed in claim 3, wherein said pattern and motion detecting means comprises:

frame memory means for delaying said luminance signal by one frame;

subtractor means for subtracting the frame-delayed luminance signal generated from the frame memory means from the input luminance signal;

absolute value means for converting the output of said subtractor means to an absolute value; and motion signal processing means for processing the output from said absolute value means as a motion signal.

6. A circuit as claimed in claim 2, wherein said first, second and third filter means comprise:

first and second clock delay means coupled in series to receive said luminance signal;

first horizontal delay means coupled to receive said luminance signal;

third and fourth clock delay means coupled in series to receive the output of said first horizontal delay means;

second horizontal delay means coupled to receive the output of said first horizontal delay means;

fifth and sixth clock delay means coupled in series to receive the output of said second horizontal delay means;

horizontal filter means coupled to receive the outputs of said first horizontal delay means and said third and fourth clock delay means;

vertical filter means coupled to receive the outputs of said first, third, and fifth clock delay means;

horizontal-vertical filter means coupled to receive the outputs of said first and second horizontal delay means, and said first, second, third, fourth, fifth and sixth clock delay means;

multiplexer means for selecting of one the outputs of said vertical, horizontal, and horizontal-vertical filter means according to a first output signal of said pattern and motion detecting means;

frame delay means for delaying the output of said third clock delay means;

first gain controller means for controlling amplitude gains of the output of said frame delay means;

second gain controller means for controlling amplitude gains of the output of said multiplexer means; and mixer means for mixing the output of said first gain controller means and the output of said second gain controller means according to a second output signal of said pattern and motion detecting means.

7. A circuit for encoding a video signal in a color television having a gamma correction matrix for separating color signals into a luminance signal and color difference signals, a plurality of low-pass filters for providing filtered color difference signals, comprising:

detector means for detecting said luminance signal to provide detected pattern and motion value signals;

first filter means for filtering said luminance signal according to said detected pattern and motion value signals to provide a first intermediate signal;

second plural filter means for filtering the filtered color difference signals according to said detected pattern and motion value signals to provide a plurality of second intermediate signals;

quadrature phase modulator means for modulating said plurality of second intermediate signals according to a chrominance sub-carrier signal and a burst flag signal to provide a third intermediate signal; and mixer means for mixing said first intermediate signal and said third intermediate signal according to a control signal to produce an encoded video signal.

8. The circuit for encoding a video signal as claimed in claim 7, wherein said detecting means comprises:

pattern detector means for detecting intrafield image patterns of said luminance signal to provide said pattern value signal; and motion detector means for detecting interframe differences of said luminance signal to provide said motion value signal.

9. The circuit for encoding a video signal as claim in claim 8, wherein said first filter means comprises:

first and second clock delay means coupled in series for receiving the luminance signal to provide first and second delay signals;

first horizontal delay means for receiving said luminance signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame delay means for frame delaying said third delay signal to provide a frame delay signal;

second gain controller means for gain controlling said frame delay signal according to said motion value signal to provide a second gain controlled signal; and mixer means for mixing said first and second gain controlled signals to provide said first intermediate signal.

10. The circuit for encoding a video signal as recited in claim 9, wherein said multiplexer means selects either the horizontal filtered signal when the pattern signal is indicative of signal having undesired high frequency components in a horizontal direction, the vertical filtered signal when said pattern signal is indicative of signal having undesired high frequency components in a vertical direction, or the horizontal-vertical filtered signal when said pattern signal is indicative of signal having either undesired high frequency components in both horizontal and vertical directions or none of said undesired high frequency components in both said horizontal and vertical directions.

11. The circuit for encoding a video signal as claimed in claim 8, wherein each of said second plural filter means comprises:

first and second clock delay means coupled in series for receiving said filtered color difference signal to provide first and second delay signals;

first horizontal delay means for receiving said filtered color difference signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal, said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame delay means for frame delaying said third delay signal to provide a frame delay signal;

second gain controller means for gain controlling said frame delay signal according to said motion value signal to provide a second gain controlled signal; and mixer means for mixing said first and second gain controlled signals to provide said second intermediate signal.

12. The circuit for encoding a video signal as claimed in claim 9, wherein said pattern detector means comprises:

plural comparator means for comparing said first and second horizontal delay signals and said first, second, third, fourth, fifth and sixth delay signals with a plurality of threshold voltages to provide a plurality of compared signals;

plural inverter means for inverting said plurality of compared signals to provide a plurality of inverted compared signals; and logic means for logically combining said plurality of compared signals and said plurality of inverted compared signals to provide said pattern value signal.

13. The circuit for encoding a video signal as claimed in claim 8, wherein said motion detector means comprises:

frame memory means for delaying said luminance signal by one frame to provide a frame delayed luminance signal;

subtractor means for subtracting said frame delayed luminance signal from said luminance signal to provide a frame difference signal;

absolute value means for providing an absolute value signal from said frame difference signal; and motion signal processor means for processing said absolute value signal to provide said motion value signal.

14. A circuit for encoding a video signal in a color television having a gamma correction matrix for separating color signals into a luminance signal and color difference signals, a plurality of low-pass filters for providing filtered color difference signal, comprising:

detector means for detecting the luminance signal to provide detected pattern and motion value signals;

first filter means for filtering said luminance signal according to said detected pattern and motion value signals to provide a first intermediate signal;

quadrature phase modulator means for modulating the filtered color difference signals according to a chrominance sub-carrier signal and a burst flag signal to provide a second intermediate signal;

second filter means for filtering said second intermediate signal according to said detected pattern and motion value signals to provide a third intermediate signal; and mixer means for mixing said first intermediate signal and said third intermediate signal according to a control signal to produce an encoded video signal.

15. The circuit for encoding a video signal as claimed in claim 14, wherein said detecting means comprises:

pattern detector means for detecting intrafield image patterns of said luminance signal to provide said pattern value signal; and motion detector means for detecting interframe differences of said luminance signal to provide said motion value signal.

16. The circuit for encoding a video signal as claimed in claim 15, wherein said first filter means comprises:

first and second clock delay means coupled in series for receiving the luminance signal to provide first and second delay signals;

first horizontal delay means for receiving said luminance signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame delay means for frame delaying said third delay signal to provide a frame delay signal;

second gain controller means for gain controlling said frame delay signal according to said motion value signal to provide a second gain controlled signal; and mixer means for mixing said first and second gain controlled signals to provide said first intermediate signal.

17. The circuit for encoding a video signal as recited in claim 16, wherein said multiplexer means selects either the horizontal filtered signal when the pattern signal is indicative of signal having undesired high frequency components in a horizontal direction, the vertical filtered signal when said pattern signal is indicative of signal having undesired high frequency components in a vertical direction, or the horizontal-vertical filtered signal when said pattern signal is indicative of signal having either undesired high frequency components in both horizontal and vertical directions or none of said undesired high frequency components in both said horizontal and vertical directions.

18. The circuit for encoding a video signal as claimed in claim 15, wherein said second filter means comprise:

first and second clock delay means coupled in series for receiving the second intermediate signal to provide first and second delay signals;

first horizontal delay means for receiving said second intermediate signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame delay means for frame delaying said third delay signal to provide a frame delay signal;

second gain controller means for gain controlling said frame delay signal according to said motion value signal to provide a second gain controlled signal; and mixer means for mixing said first and second gain controlled signals to provide said third intermediate signal.

19. The circuit for encoding a video signal as claimed in claim 16, wherein said pattern detector means comprises:

plural comparator means for comparing the first and second horizontal delay signals and the first, second, third, fourth, fifth and sixth delay signals with a plurality of threshold voltages to provide a plurality of compared signals;

plural inverter means for inverting said plurality of compared signals to provide a plurality of inverted compared signals; and logic means for logically combining said plurality of compared signals and said plurality of inverted compared signals to provide said pattern value signal.

20. The circuit for encoding a video signal as claimed in claim 16, wherein said motion detector means comprises:

frame memory means for delaying the luminance signal by one frame to provide a frame delayed luminance signal;

subtractor means for subtracting said frame delayed luminance signal from said luminance signal to provide a frame difference signal;

absolute value means for providing an absolute value signal from said frame difference signal; and motion signal processor means for processing said absolute value signal to provide said motion value signal.

21. A circuit for encoding a video signal, comprising:

means for receiving a luminance signal and color difference signals;

detecting means for detecting patterns of a frequency spectrum and motion pixels of said luminance signal to provide detected pattern and motion value signals;

first filter means for filtering said luminance signal according to said detected pattern and motion value signals to provide a first intermediate signal;

second plural filter means for filtering said color difference signals according to said detected pattern and motion value signals to provide a plurality of second intermediate signals;

means for modulating said plurality of second intermediate signals according to first control signals to provide a third intermediate signal; and means for mixing said first intermediate signal and said third intermediate signal according to second control signals to produce an encoded video signal.

22. The circuit for encoding a video signal as claimed in claim 21, wherein said detecting means comprises:

pattern detector means for detecting intrafield image patterns of said luminance signal to provide said pattern value signal; and motion detector means for detecting interframe differences of said luminance signal to provide said motion value signal, said motion detection comprising:

frame memory means for delaying said luminance signal by one frame to provide a frame delayed luminance signal;

subtractor means for subtracting said frame delayed luminance signal from said luminance signal to provide a frame difference signal;

absolute value means for providing an absolute value signal from said frame difference signal; and motion signal processor means for processing said absolute value signal to provide said motion value signal.

23. The circuit for encoding a video signal as claimed in claim 21, wherein said first filter means comprises:

first and second clock delay means coupled in series for receiving the luminance signal to provide first and second delay signals;

first horizontal delay means for receiving said luminance signal to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal.

fifth and sixth clock delay means coupled in series for receiving said second horizontal delay signal to provide fifth and sixth delay signals;

horizontal filter means for receiving said first horizontal delay signal and said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame delay means for frame delaying said third delay signal to provide a frame delay signal;

second gain controller means for gain controlling said frame delay signal according to said motion value signal to provide a second gain controlled signal; and mixer means for mixing said first and second gain controlled signals to provide said first intermediate signal.

24. The circuit for encoding a video signal as claimed in claim 22, wherein said multiplexer means selects the horizontal filtered signal when the pattern value signal is indicative of undesired high frequency components in a horizontal direction, the vertical filtered signal when said pattern value signal is indicative of said undesired high frequency components in a vertical direction, and the horizontal-vertical filtered signal when said pattern value signal is indicative of said undesired high frequency components in both horizontal and vertical directions.

25. The circuit for encoding a video signal as claimed in claim 23, wherein each of said second plural filter means comprises:

first and second clock delay means coupled in series for receiving said color difference signals to provide first and second delay signals;

first horizontal delay means for receiving said color difference signals to provide a first horizontal delay signal;

third and fourth clock delay means coupled in series for receiving said first horizontal delay signal to provide third and fourth delay signals;

second horizontal delay means for receiving said first horizontal delay signal to provide a second horizontal delay signal;

fifth and sixth clock delay means coupled in series for receiving said second horizontal delay signal to provide fifth and sixth delay signals;

horizontal filter means for receiving said first horizontal delay signal, said third and fourth delay signals to provide a horizontal filtered signal;

vertical filter means for receiving said first, third, and fifth delay signals to provide a vertical filtered signal;

horizontal-vertical filter means for receiving said first and second horizontal delay signals and said first, second, third, fourth, fifth, and sixth delay signals to provide a horizontal-vertical filtered signal;

multiplexer means for selecting one of said horizontal filtered signal, said vertical filtered signal, and said horizontal-vertical filtered signal to provide a selected signal according to said pattern value signal;

first gain controller means for gain controlling said selected signal according to said motion value signal to provide a first gain controlled signal;

frame delay means for frame delaying said third delay signal to provide a frame delay signal;

second gain controller means for gain controlling said frame delay signal according to said motion value signal to provide a second gain controlled signal; and mixer means for mixing said first and second gain controlled signals to provide said second intermediate signal.

26. A circuit for encoding a video signal, comprising:

means for receiving a luminance signal and color difference signals;

detecting means for detecting the luminance signal to provide detected pattern and motion value signals;

first filter means for filtering said luminance signal according to said detected pattern and motion value signals to provide a first intermediate signal;

means for modulating the filtered color difference signals according to first control signals to provide a second intermediate signal;

second filter means for filtering said second intermediate signal according to said detected pattern and motion value signals to provide a third intermediate signal; and means for mixing said first intermediate signal and said third intermediate signal according to second control signals to produce an encoded video signal.

* * * * *